(12) United States Patent
Bernet et al.

(10) Patent No.: US 10,702,871 B2
(45) Date of Patent: Jul. 7, 2020

(54) LABORATORY INSTRUMENT BASE PLATE

(71) Applicant: Roche Molecular Systems, Inc., Pleasanton, CA (US)

(72) Inventors: Roland Bernet, Rotkreuz (CH); Marco Sangermano, Rotkreuz (CH); Simon Siegenthaler, Urdorf (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 0 days.

(21) Appl. No.: 16/055,595

(22) Filed: Aug. 6, 2018

(65) Prior Publication Data

US 2019/0388898 A1 Dec. 26, 2019

(30) Foreign Application Priority Data

Aug. 8, 2017 (EP) .................................... 17185386

(51) Int. Cl.
| | |
|---|---|
| *G01N 1/22* | (2006.01) |
| *B01L 9/00* | (2006.01) |
| *G01N 35/04* | (2006.01) |
| *G01N 35/10* | (2006.01) |
| *B01L 9/06* | (2006.01) |

(52) U.S. Cl.
CPC ................ *B01L 9/54* (2013.01); *G01N 35/04* (2013.01); *G01N 35/1011* (2013.01); *B01L 9/06* (2013.01); *G01N 2035/0494* (2013.01)

(58) Field of Classification Search
CPC ........ B01L 9/54; G01N 35/04; G01N 35/1011
USPC ............. 248/121; 73/863.22, 863.21, 864.91
See application file for complete search history.

(56) References Cited

U.S. PATENT DOCUMENTS

| | | | |
|---|---|---|---|
| 2009/0090198 A1* | 4/2009 | Deggeral ................. | B03C 1/30 73/863.22 |
| 2014/0263879 A1* | 9/2014 | Barton ............... | G01N 35/1065 248/121 |

FOREIGN PATENT DOCUMENTS

WO      2017064089 A1      4/2017

\* cited by examiner

*Primary Examiner* — Todd M Epps
(74) *Attorney, Agent, or Firm* — Eric Grant Lee (57) ABSTRACT

A laboratory instrument comprising a single base plate is presented. The single base plate comprises at least one embedded consumable compartment, an embedded sample processing compartment, an embedded waste compartment, an embedded activation device compartment, an embedded rack receiving compartment, or a combination thereof. A laboratory system and a method adjusting the positioning of at least one pipetting device or handling device of a laboratory instrument or laboratory system are also disclosed.

13 Claims, 6 Drawing Sheets

LABORATORY INSTRUMENT BASE PLATE

CROSS REFERENCE TO RELATED APPLICATIONS

This application claims the benefit under 35 U.S.C. § 119(a) of priority of European Patent Application No. EP 17185386.4, filed Aug. 8, 2017, which is incorporated herein by reference in its entirety.

FIELD OF THE INVENTION

The present invention belongs to the field of automated in vitro diagnostic sample processing. Within this field, it relates to a laboratory instrument, a laboratory system and a method for adjusting the positioning of pipetting devices or handling devices of laboratory instruments or laboratory systems in order to ensure accuracy and safety of certain sample processing steps.

BACKGROUND

In diagnostic laboratories, automated pre-analytical, analytical, and post-analytical laboratory instruments are used for various sample processing steps to produce accurate and reliable test results which represent pivotal information for physicians. Typically, such laboratory instruments are equipped with consumables, sample processing devices, waste containers, sample racks, and reagent racks which are accommodated in dedicated units assembled on a working surface within the laboratory instrument. Thus, the interior and the working surface of a laboratory instrument are built with a plurality of units and construction components which must be precisely adapted to one another for being assembled.

For a reliable and safe operation, such laboratory instruments have to be well maintained. The different components and the working surface of the laboratory instrument have to be cleaned on a regular basis to avoid cross contaminations which can lead to erroneous test results. The thorough cleaning of the interior of the laboratory instrument also ensures the safety of the operator and extends the laboratory instrument lifetime. As the downtime of the laboratory instrument should be kept as short as possible, the cleaning of the laboratory instrument should be as efficient as possible. However, as conventional laboratory instruments comprise multiple assembled units and construction components, the working surface of the laboratory instrument may possess small gaps and splits which complicate the thorough cleaning of the interior of the laboratory instrument. Particularly, in laboratory instruments in the area of nucleic acid analytics where a highly sensitive analytical technology is used, smallest impurities may have severe consequences on test results and subsequent diagnosis.

Some sample processing steps include pipetting operations like the aspiration and/or dispensation of liquid samples and reagents out of and/or into vessels using a pipetting device. For those pipetting operations an accurate positioning of the pipette device relative to the sample vessels or reagent vessels positioned on the working surface is important as a physical contact between the pipette tip of the pipetting device and the sample vessels or reagent vessels can cause sample cross-contamination, reagent cross-contamination, and/or damage of the vessels or pipetting device of the laboratory instrument. Therefore, the positioning of the pipetting device has to be adjusted or calibrated on a regular basis.

U.S. Patent Publication Nos. US 2014/0263879 A1 and US 2009/0090198 A1 disclose laboratory apparatuses providing base plates or working surfaces for mounting or positioning other elements of the apparatuses.

There is a need to maintain diagnostic laboratory instruments in a simple and efficient way. It is an object of the present invention to improve conventional instrument working surfaces, particularly to better serve the needs of automated in vitro diagnostic sample processing.

SUMMARY

The present invention discloses a laboratory instrument, a laboratory system and a method for adjusting the positioning of at least one pipetting device or handling device of the laboratory instrument or laboratory system.

The laboratory instrument comprises a single base plate comprising at least one embedded compartment. At least one of said embedded compartment is selected from a group consisting of an embedded consumable compartment, an embedded sample processing compartment, an embedded waste compartment, an embedded activation device compartment, an embedded rack receiving compartment, or a combination thereof.

The present invention also relates to a laboratory system which comprises a laboratory instrument as described herein and at least one consumable or at least one sample processing device or at least one rack or a combination thereof.

The present invention also relates to a method for adjusting the positioning of at least one pipetting device or handling device of a laboratory instrument or laboratory system as described herein. The method comprises the following steps:

the at least one transfer system moves the at least one pipetting device or handling device towards the at least one reference structure the at least one reference structure detection device of the at least one pipetting device or handling device detects the at least one reference structure, wherein the at least one reference structure detection device generates at least one signal upon detection of the at least one reference structure and sends the at least one signal to the control device the control device receives the at least one signal from the at least one reference structure detection device and determines position information of the at least one reference structure based on the received at least one signal the control device compares the determined position information of the at least one reference structure with predefined position information of the at least one reference structure the control device determines and stores a deviation between the determined position information of the at least one reference structure and the predefined position information of the at least one reference structure the control device adjusts the positioning of the at least one pipetting device or handling device of the laboratory instrument or laboratory system according to the determined and stored deviation between the determined position information of the at least one reference structure and the predefined position information of the at least one reference structure.

DETAILED DESCRIPTION

The present invention relates to a laboratory instrument which comprises a single base plate comprising at least one embedded compartment. At least one of said embedded compartment is selected from a group consisting of: an embedded consumable compartment, an embedded sample processing compartment, an embedded waste compartment, an embedded activation device compartment, an embedded rack receiving compartment, or a combination thereof.

As used herein, the term "laboratory instrument" relates to any pre-analytical, analytical, or post-analytical instrument for performing sample or sample vessel processing steps. A pre-analytical instrument can usually be used for the preliminary processing of samples or sample vessels. An analytical instrument can be designed, for example, to use a sample or part of the sample and a reagent in order to produce a measurable signal, on the basis of which it is possible to determine whether the analyte is present, and if desired in what concentration. A post-analytical instrument can usually be used for the post-processing of samples like the archiving of samples. The pre-analytical, analytical and post-analytical instrument may comprise, for example, at least one device from the group of following devices: a sorting device for sorting samples or sample vessels, a cap removal device for removing caps or closures on sample vessels, a cap fitting device for fitting caps or closures on sample vessels, a pipetting device for pipetting a sample, an aliquoting device for aliquoting samples, a centrifuging device for centrifuging samples, an analyzing device for analyzing a sample, a heating device for heating a sample, a cooling device for cooling a sample, a mixing device for mixing a sample, a separation device for isolating an analyte of the sample, a storing device for storing samples, an archiving device for archiving samples, a sample vessel type determination device for determining a sample vessel type, a sample quality determination device for determining a sample quality. The laboratory instrument may comprise a three-dimensional rectangular coordinate system comprising a x direction, y direction, and z direction which are perpendicularly aligned with respect to each other, with the first and second directions (x, y) spanning a plane and the third direction (z) being perpendicularly aligned with respect to the plane. In one embodiment, the first and second directions (x, y) can span a horizontal plane and the third direction (z) can be vertically aligned (direction of fall). In the following description, reference is made to the three directions x, y, and z.

As used herein, the term "single base plate" relates to a plate mounted within the laboratory instrument which represents the actual working surface on which sample, sample vessel, reagent and/or reagent vessel processing steps of the laboratory instrument are carried out. For this purpose, the base plate is provided with embedded compartments for accommodating consumables, sample processing devices, waste containers, activation devices, and racks which are required for carrying out the sample, sample vessel, reagent and/or reagent vessel processing steps. The single base plate consists of one single piece and can be made of any suitable material with sufficient rigidity (e.g. metal and/or plastic). The single base plate may have different shapes and forms to meet the requirements of the laboratory instrument.

The term "embedded compartment" as used herein, means that the compartment and the single base plate consist of one single formed piece. Thus, there are no gaps or splits between the actual working surface and the embedded compartment which allows an efficient and thorough cleaning of the working surface of the laboratory instrument. The embedded compartment encompasses an inner volume and may be designed as recesses or protrusions of the single base plate.

As used herein, the term "embedded consumable compartment" relates to a dedicated embedded compartment of the single base plate adapted for receiving, storing, and/or releasing consumables used for operating a laboratory instrument. The embedded consumable compartment can be manually or automatically loaded/unloaded with consumables like for example pipette tip racks, sample vessel racks, multiwell plates, reagent containers, reagent container racks, or reaction vessel racks.

As used herein, the term "embedded sample processing compartment" relates to a dedicated embedded compartment of the single base plate adapted for mounting or accommodating one or more sample processing devices used for conducting sample processing steps. Examples of sample processing devices are heating devices, cooling devices, mixing devices, separation devices, analyzing devices, storing devices, or centrifugation devices.

As used herein, the term "embedded waste compartment" relates to a dedicated embedded compartment of the single base plate adapted for receiving, storing, and/or releasing waste containers. The embedded waste compartment can be manually or automatically loaded/unloaded with waste containers like for example tip waste racks or waste bags used for disposing used consumables, samples or reagents.

As used herein, the term "embedded activation device compartment" relates to a dedicated embedded compartment of the single base plate for accommodating an activation device. The term "activation device" as used herein relates to a stationary structure which can engage with a part of a moving device like a pipetting device or handling device. And the activation device can activate or change a specific mechanism or functionality of the moving device by means of engagement with the part of the moving device. An activation device may be designed as described in WO2017/064089, reference number 176 in FIGS. 11, 12, 13, 14, 16 and corresponding figure descriptions.

As used herein, the term "embedded rack receiving compartment" relates to an embedded compartment of the single base plate adapted for loading and unloading racks. The embedded rack receiving compartment can be manually or automatically loaded/unloaded with racks like for example sample vessel racks or reagent container racks.

In one embodiment of the laboratory instrument as described herein, the laboratory instrument comprises a housing. The housing comprises a frame and the single base plate is mounted on the frame within the laboratory instrument. As the housing comprises a frame configured to support the base plate, the housing serves also as a supporting structure. The housing may further comprise a bottom plate, a rear wall, two opposing side walls, a front wall, and a top wall. Thus, the interior of the laboratory instrument may be protected from the environment by the housing. Thereby, pollution from outside or unwanted access to the interior of the laboratory instrument is prevented. The front wall and/or top wall may form a hood which can be moved from a closed position, in which an interior of the housing is prevented from access, to an open position, in which the interior of the housing is exposed so as to allow access, and vice versa. The frame may comprise a plurality of profiles. The profiles are connected to one another. Thus, the frame may be designed in a modular manner as it is built up by profiles. Particularly, the use of profiles allows for a variety of designs and a scaled up or scaled down construction of the frame. The term "profile" as used herein refers to an elongated constructional member. The profiles may be made by extrusion. As such, the profiles may be so called extrusion profiles. The profiles may be connected to one another using connecting elements such as screws or clamps. The profiles may be made of plastics and/or metal. For example, the profiles are made of aluminium for a lightweight construction. As the single base plate is mounted on the frame, the single base plate contributes to the stability of the housing.

In an alternative embodiment, the laboratory instrument comprises a scaffold or supporting structure enclosed by a laboratory instrument case which covers the interior of the laboratory instrument to protect it from the environment. And the single base plate is mounted on the scaffold or supporting structure within the laboratory instrument.

In one embodiment of the single base plate, the single base plate is made of thermoplastic or duroplastic polymers which are well known in the art. By supplying energy, those polymers can be brought into a desired shape or form of the single base plate by various manufacturing or forming processes. After the single base plate has cooled, it retains its shape and form. For example, the single base plate is made of the thermoplastic polymer ABS GF 17 (Acrylonitrile butadiene styrene with 17% glass fibre) for a light and the same time stable construction.

In a further embodiment of the single base plate, the single base plate is an injection molding plate. Injection molding is a manufacturing or forming process for producing a work piece like the single base plate by injecting material like thermoplastic or duroplastic polymers into a mold. Material for the single base plate is fed into a heated barrel, mixed, and forced into a mold cavity, where it cools and hardens to the configuration of the cavity. With injection molding almost all shapes or forms of the single base plate and the at least one embedded compartment which are formed as one single piece can be manufactured with high precision and at a low price. Among the various possible manufacturing or forming processes, the thermoplastic foam injection molding is well suited for the production of a single base plate with a certain size required for laboratory instruments.

In an alternative embodiment, the single base plate is a 3D printer product. 3D printers can produce a virtually free-formable single base plate from a filament consisting of thermoplastic or duroplastic polymers. As no mold cavity is used for the forming process, 3D printing is well suited to produce small batches of single base plates.

In one embodiment of the single base plate, the single base plate is coated with an UV light and reagent resistant varnish. As UV light is widely used for decontaminating the interior and working surfaces of laboratory instruments, the UV light resistant characteristics of the varnish can protect the single base plate from UV light based deteriorations. During operation of the laboratory instrument, the single base plate may also be exposed to various reagents (test reagents, elution buffers, lysis buffers, washing buffers, etc.) as sample and sample vessel processing steps like pipetting operations or removal/fitting of sample vessel caps can cause splashes, droplets or aerosol. Thus, the base plate has to be protected from reagents as well as cleaning agents in order to prevent damages of the single base plate. One example of a varnish with good UV light and reagent resistant characteristics suitable for the single base plate is Duoplast U242.

In one embodiment of the at least one embedded compartment, the at least one embedded compartment comprises rounded corners or rounded edges or a combination thereof. Thereby, no impurities can accumulate in corners and cleaning of the single base plate is more thorough and efficient.

In a further embodiment of the at least one embedded compartment, the at least one embedded compartment comprises at least two side walls which encompass an inner volume, a bottom, and an open top, wherein the at least two side walls are opposite each other or adjacent each other. The side walls and bottom of the embedded compartment may be closed surfaces or may have one or more openings for providing access to the inner volume from the side or from below. Access to the inner volume from the side or below may be advantageous for providing the electrical power supply and/or mounting of sample processing devices within a sample processing compartment. Additionally, the one or more openings of the side walls and bottom may serve for heat dissipation.

In one embodiment of the embedded consumable compartment, the embedded consumable compartment may have four closed side walls which are opposite each other, a closed bottom, and an open top into which at least one consumable can be inserted.

In one embodiment of the embedded waste compartment, the embedded waste compartment may have four closed side walls which are opposite each other, a closed bottom, and an open top into which at least one waste container can be inserted.

In one embodiment of the embedded rack receiving compartment, the embedded rack receiving compartment may have three side walls and a closed bottom forming a rack slot with a closed rear end and an open front end into which one or multiple sample vessel racks or reagent container racks can be inserted.

In one embodiment of the embedded sample processing device compartment, the embedded sample processing device compartment may have four side walls, a bottom with at least one opening, an open top into which at least one sample processing device can be mounted.

In one embodiment of the single base plate, the single base plate further comprises at least one embedded support element. At least one of said embedded support element is selected from a group consisting of a cable channel, an air channel, a display frame, an identification device or sensor holder, an instrument interlock module, a latch-fit or snap-latch, or a combination thereof. The term "embedded support element" as used herein, means that the support element and the single base plate consist of one single formed piece. Accordingly, the number of construction components is further reduced compared to conventional constructions of laboratory instruments.

In a further embodiment of the single base plate, the single base plate comprises at least one reference structure. The at least one reference structure comprises a geometric form for determining reference position information within the three-dimensional rectangular coordinate system of the laboratory instrument. The at least one reference structure can be a defined reference bolt or reference mark which is designed as a rectangular recesses, round recesses, cubic protrusion or cylindrical protrusion of the single base plate. The at least one reference structure of the single base plate is detectable by a reference structure detection device like a pressure sensor, an air pressure sensor, an optical sensor, a laser, an ultrasound sensor, or a combination thereof. Upon detection of the reference structure of the single base plate, reference position information within the interior of the laboratory instrument or laboratory system is determined and used for adjusting or calibrating the positioning of at the least one pipetting device or handling device of the laboratory instrument or laboratory system.

In one embodiment of the laboratory instrument, the laboratory instrument additionally comprises at least one electrically conductive element. The at least one electrically conductive element is mounted on the single base plate. The electrically conductive element can be made of any conductive material and can have any geometric form and size. The term "electrically conductive" as used herein, means that the material of which the element is made of has the property to conduct an electrical current.

In one embodiment of the at least one electrically conductive element, the at least one electrically conductive element comprises at least one reference structure. The at least one reference structure comprises a geometric form for determining reference position information within the three-dimensional rectangular coordinate system of the laboratory instrument. The at least one reference structure can be a defined reference bolt or reference mark which is designed as a rectangular recess, round recesses, cubic protrusion or cylindrical protrusion of the electrically conductive element.

In one embodiment of the at least one reference structure, the at least one reference structure can be defined as a through-hole of the electrically conductive element. The at least one reference structure of the electrically conductive element is detectable by a reference structure detection device like a conductive pipette tip, a conductive pipette nozzle, a conductive gripper finger, a pressure sensor, an air pressure sensor, an optical sensor, a laser, an ultrasound sensor, or a combination thereof. Upon detection of the reference structure, reference position information within the interior of the laboratory instrument or laboratory system is determined and used for adjusting or calibrating the positioning of the at least one pipetting device or handling device of the laboratory instrument or laboratory system as described further below.

In a further embodiment of the at least one electrically conductive element, the at least one electrically conductive element comprises one or more electrically conductive sheets. At least one of the one or more electrically conductive sheets comprises at least one through-hole and the at least one through-hole is aligned with the open top of at least one embedded compartment of the single base plate. The form of the at least one through-hole is congruent with the open top of at least one embedded compartment so that consumables can be loaded/unloaded into the embedded consumable compartment, a sample processing device in the embedded sample processing compartment can be accessed by the operator or pipetting/handling device, a waste container can be loaded/unloaded into the embedded waste compartment, or racks can be loaded/unloaded into the embedded rack receiving compartment.

In a specific embodiment of the at least one electrically conductive element, the at least one electrically conductive element is made of aluminum.

In one embodiment of the one or more electrically conductive sheets, the at least one through-hole is the least one reference structure. The through-hole may be rectangular and the two edges which are perpendicular to each other define the x and y values of the reference position information. Alternatively, the x and y values of the reference position information can also be defined with a round through-hole. The z value of the reference position information can be defined by the position of the electrically conductive sheet along the z direction. As the reference structure can be a through-hole which is aligned and congruent with the open top of an embedded consumable compartment there is enough free space for moving the reference structure detection device towards the edges of the through-hole without encountering any obstacles. This allows a safe and accurate detection of the reference structure. Furthermore, a space-saving design of the interior of the laboratory instrument is possible as no additional free space is necessary for moving the reference structure detection device towards the reference structure.

In a further embodiment of the one or more electrically conductive sheets, the one or more electrically conductive sheets comprise at least one latch-fit or snap-latch. The latch-fit or snap-latch is located on the electrically conductive sheet so that consumables with corresponding counter snap-latches or latch-fits can be attached precisely and reversibly to the electrically conductive sheet. Thus, consumables can be easily loaded/unloaded manually and at the same time the consumables like for example pipette tip racks are precisely and vertically aligned for an optimal operation of the laboratory instrument.

In one embodiment of the one or more electrically conductive sheets, the one or more electrically conductive sheets are mounted on the single base plate with one or more screws. Alternatively, the one or more electrically conductive sheets can be mounted on the single base plate with one or more clamps.

In a more specific embodiment, the one or more screws are shoulder screws, wherein the one or more electrically conductive sheets are additionally mounted with at least one fixed-point on the single base plate. To ensure that the different thermal expansions of metal (e.g. aluminum) and plastic (e.g. thermoplastic polymer) do not cause any tensioning of the single base plate and the one or more electrically conductive sheets, the one or more electrically conductive sheets are mounted with shoulder screws which permit a compensation of the thermal expansion in the x and y directions and prevent a compensation of the thermal expansion in the z direction. In order to restrict the x and y directions of the thermal expansion the one or more electrically conductive sheets are pinned with at least one fixed-point on the single base plate. The at least one fixed point can be a square, round or oblong hole in the one or more electrically conductive sheets. The single base plate comprises pins which are vertically aligned to the fixed-points so that the pins can engage the fix-points for a floating mounting of the one or more electrically conductive sheets on the single base plate.

In one embodiment of the laboratory instrument, the laboratory instrument comprises at least one pipetting device or handling device. The at least one pipetting device or handling device comprises at least one reference structure detection device. The laboratory instrument further comprises at least one transfer system which is connected to the at least one pipetting device or handling device. The at least one transfer system is constructed to move the at least one pipetting device or handling device in the three-dimensional directions within the laboratory instrument.

The term "pipetting device" as used herein relates to a device which either couples disposable pipette tips or comprises pipetting needles, and which can aspirate and dispense samples and/or reagents necessary for performing sample processing steps. In one embodiment, the pipetting device has one pipette tip or needle for aspirating and/or dispensing one sample or reagent or a combination thereof. Alternatively, the pipetting device has multiple pipette tips or needles for aspirating and/or dispensing multiple samples or reagents or a combination thereof at the same time. The one or more pipette tip or needle can additionally be a reference structure detection device.

The term "handling device" as used herein relates to a device which can grip and move items within the laboratory instrument. In one embodiment, the handling device comprises gripper fingers for gripping and moving consumables, waste containers, sample vessels, or reagent vessels in order to load/unload the corresponding embedded consumable compartments. Such a handling device can also be used for removing and/or fitting caps or closures on sample vessels and/or regent containers. The gripper finger or fingers can additionally be a reference structure detection device.

The term "transfer system" as used herein relates to a device for moving the at least one pipetting device or handling device within the interior of the laboratory instrument. In one embodiment, the transfer system comprises at least one guide rail along each of the three directions x, y, and z of the three-dimensional rectangular coordinate system of the laboratory instrument. The pipetting device or handling device is movable in the x, y, and z direction along those guide rails by suitable drives. In another embodiment, the transfer system comprises at least one guide rail along each x and y direction and the pipetting device contains a drive for moving the pipette tip in the z direction. The pipetting device is movable along the guide rail along the x direction. And the guide rail along the x direction is in turn movable on the at least one rail along the y direction by means of a suitable drive. The at least one rail along the y direction is mounted on the single base plate. In an alternative embodiment, the transfer system is an arm of an industrial robot comprising one or more movable joints for moving the pipetting device or handling device in the three-dimensional directions within the laboratory instrument.

The term "reference structure detection device" as used herein relates to a device which can detect the reference structure and sends signals to a control device for determining reference position information consisting of x, y, and z values based on the detected reference structure. In one embodiment, the at least one reference structure detection device of the at least one pipetting device is selected from a group consisting of a conductive pipette tip, a conductive pipette nozzle, a pressure sensor, an air pressure sensor, an optical sensor, a laser, an ultrasound sensor, or a combination thereof. In one embodiment, the reference structure detection device of the at least one handling device is selected from a group consisting of a conductive gripper finger, a pressure sensor, an optical sensor, a laser, an ultrasound sensor, or a combination thereof.

The present invention also relates to a laboratory system which comprises a laboratory instrument as described herein and at least one consumable or at least one sample processing device or at least one rack or a combination thereof.

The term "consumable" as used herein relates to an item used in sample processing steps and subsequently discarded, such as, as non-limiting examples, plastic consumables such as pipette tips, pipette tip racks, sample vessels, sample vessel racks, multiwell plates, reagent containers, reagent container racks, reaction vessels, reaction vessel racks. Such consumables are well known in the art.

The term "sample processing device" as used herein relates to a device for processing a sample such as, as non-limiting examples, heating devices, cooling devices, mixing devices, separation devices, analyzing devices, storing devices, or centrifugation devices. Such devices are well known in the art.

The term "rack" as used herein relates to a holder with one or multiple insertion areas for inserting one or multiple pipette tips, sample vessels, reagent containers, or reaction vessels in an upright position.

In one embodiment of the embedded consumable compartment, the embedded consumable compartment forms an inner volume and the inner volume of the embedded consumable compartment has a dimension which is larger than the dimension of the consumable. And the consumable is selected from a group consisting of a pipette tip rack, a sample vessel rack, multiwell plate, a reagent container, or a reaction vessel rack. Thus, consumables can be loaded/unloaded manually or automatically into the embedded consumable compartments from where the pipetting device or handling device can access the consumables for operating the laboratory system.

In a further embodiment of the embedded consumable compartment, the embedded consumable compartment is constructed and arranged to encompass the consumable selected from a group consisting of a pipette tip rack, a sample vessel rack, a reagent container, or a reaction vessel rack, and a space is present between the embedded consumable compartment and the consumable. Accordingly, direct contact between the embedded consumable compartment and the consumable which may cause a contamination of the consumable is prevented.

In one embodiment of the laboratory system, the laboratory system comprises more than one type of consumable, wherein any type of consumable comprises a specific and unique recognition feature such as a unique size, unique cross-section or unique surface geometry. The single base plate can be provided with multiple embedded consumable compartments and at least one embedded consumable compartment is constructed and arranged to recognize specifically said unique recognition feature of one type of consumable.

In a specific embodiment of the embedded consumable compartment, the embedded consumable compartment has at least one specific recognition element for recognizing a specific consumable. The term "recognition element" as used herein relates to elements, such as a guidance element formed on the inside of the embedded consumable compartment which fits specifically with the unique recognition feature of one type of consumable.

In a specific embodiment of the laboratory system, the at least one specific recognition element comprises a unique surface geometry of the embedded consumable compartment. And the unique surface geometry of the embedded consumable compartment is complementary to a unique surface geometry of the specific consumable. The term "surface geometry" relates to the surface structure, more specifically the surface structure of the side walls of the embedded consumable compartment and consumable. A "unique surface geometry" is understood to be a surface geometry which is unique for a type of consumable and corresponding embedded consumable compartment and is substantially different from the surface geometries of other consumables and corresponding consumable compartments such that the consumable is specifically recognized by the recognition element of the corresponding embedded consumable compartment.

In a specific embodiment of the unique surface geometry of the specific consumable, the unique surface geometry of the specific consumable comprises one or more recesses and/or ridges integrally formed in the unique surface of the specific consumable. Thus, a specific type of consumable can only be loaded into a specific embedded consumable compartment. In case of manual loading of consumables into the laboratory instrument, this prevents the operator from loading the wrong consumable into a specific embedded consumable compartment, even if the consumables have the same horizontal cross section.

In a further embodiment of the laboratory system, at least one latch-fit or snap-latch is located on the single base plate adjacent to the at least one embedded consumable compartment. And at least one corresponding counter snap-latch or latch-fit is located on the consumable in a manner to reversibly engage into the latch-fit or snap-latch of the single base plate.

In an alternative embodiment of the laboratory system, the at least one latch-fit or snap-latch is located on the one or more electrically conductive sheets adjacent to the at least one through-hole and the consumable comprises the at least one corresponding counter snap-latch or latch-fit located in a manner to reversibly engage into the latch-fit or snap-latch adjacent of the electrically conductive sheet. Thus, consumables can easily be loaded/unloaded and reversibly attached to the single base for an optimal and safe operation of the laboratory instrument.

In one embodiment of the embedded sample processing compartment, the embedded sample processing compartment is constructed to encompass at least one sample processing device. The sample processing device is selected from a group consisting of a heating device, a cooling device, a mixing device, a separation device, an analyzing device, a storing device, or a combination thereof. And a space is present between the sample processing compartment and the at least one sample processing device. The side walls and the bottom of the embedded sample processing device may further comprise one or multiple openings for electrical power supply, mounting, and heat dissipation of the sample processing device.

In a further embodiment of the embedded sample processing compartment, the embedded sample processing compartment forms an inner volume and the inner volume of the embedded sample processing compartment has a dimension which is larger than the dimension of at least one sample processing device selected from a group consisting of a heating device, a cooling device, a mixing device, a separation device, an analyzing device, a storing device, or a combination thereof. Depending on the configuration of the laboratory instrument, sample processing devices can be mounted in separate embedded sample processing compartments so that they can be shielded from each other in order to prevent a mutual negative influence. For example, heating and cooling devices can be mounted in separate embedded sample processing compartments in order to prevent any undesirable temperature exchange. But also multiple sample processing devices can be mounted in the same embedded sample processing compartment. For example, multiple sample processing devices of the same type can be accommodated in the same embedded sample processing compartment for a compact design of the interior of the laboratory instrument.

In one embodiment of the laboratory system, the embedded rack receiving compartment is constructed to receive at least one sample vessel rack or at least one reagent container rack.

In a further embodiment of the embedded rack receiving compartment, the embedded rack receiving compartment forms an inner volume and the inner volume of the embedded rack receiving compartment has a dimension which is larger than the dimension of at least one sample vessel rack or at least one reagent container rack. The embedded rack receiving compartment may comprise two side walls, a rear end, and an open front end forming a rack slot into which one or multiple sample vessel racks or reagent container racks may be inserted manually or automatically.

In a more specific embodiment of the embedded rack receiving compartment, the embedded rack receiving compartment has a sliding surface on which at least one sample vessel rack or at least one reagent container rack is slidably moveable between a front end and a rear end of the rack receiving compartment, wherein the sliding surface comprises rack guiding elements. In order to load the rack into the embedded rack receiving compartment, the rack merely has to be linearly moved along the guiding elements towards the rear end of the embedded rack receiving compartment. Thereby, the risk of incorrectly inserting the rack is minimized. The sliding surface may comprise several rack guiding elements which can divide the sliding surface in different lanes so that multiple sample vessel racks and/or container racks can be loaded/unloaded into the same embedded rack receiving compartment.

In a specific embodiment of the laboratory system, the laboratory system further comprises a control device for controlling the movements of the at least one transfer system. The term "control device" as used herein encompasses any physical or virtual processing device configurable to control the laboratory system in a way that sample or sample vessel processing steps are conducted by the laboratory system. The control device may, for example, instruct the laboratory system to conduct pre-analytical, post-analytical and analytical sample processing steps. The control device may receive information from a data management unit regarding which steps need to be performed with a certain sample. The control device may, for instance, be embodied as a programmable logic controller adapted to execute a computer-readable program provided with instructions to perform operations of the laboratory instrument. One example of such an operation is to control the movements of the at least one transfer system in order to move the at least one pipetting device or handling device in the three-dimensional directions x, y, and z to a target position within the laboratory instrument. A further example of such an operation is to conduct a method for adjusting the positioning of at least one pipetting device or handling device of a laboratory instrument or laboratory system as described further below.

In one embodiment of the control device, the control device is comprised by the laboratory instrument.

In another embodiment, the control device is an external device communicatively connected to the laboratory instrument.

The present invention also relates to a method for adjusting the positioning of at least one pipetting device or handling device of a laboratory instrument or laboratory system as described herein. The method comprises the following steps:

a) the at least one transfer system moves the at least one pipetting device or handling device towards the at least one reference structure b) the at least one reference structure detection device of the at least one pipetting device or handling device detects the at least one reference structure, wherein the at least one reference structure detection device generates at least one signal upon detection of the at least one reference structure and sends the at least one signal to the control device c) the control device receives the at least one signal from the at least one reference structure detection device and determines position information of the at least one reference structure based on the received at least one signal d) the control device compares the determined position information of the at least one reference structure with predefined position information of the at least one reference structure e) the control device determines and stores a deviation between the determined position information of the at least one reference structure and the predefined position information of the at least one reference structure f) the control device adjusts the positioning of the at least one pipetting device or handling device of the laboratory instrument or laboratory system according to the determined and stored deviation between the determined position information of the at least one reference structure and the predefined position information of the at least one reference structure.

During operation of the laboratory instrument, where hundreds of sample processing steps may be conducted per day, the accuracy of the positioning of the pipetting device or handling device may decrease over time which causes erroneous operations of the laboratory instrument or even damages of the vessels or the at least one pipetting device or handling device of the laboratory instrument. Therefore, the method for adjusting the positioning of the at least one pipetting device or handling device of a laboratory instrument or laboratory system should be repeated from time to time. The term "positioning" as used herein means that the at least one pipetting device or handling device is moved to a target position by the transfer system within the laboratory instrument for conducting a certain sample processing step at the target position, wherein the target position comprises predefined position information consisting of x, y, and z values within the three-dimensional rectangular coordinate system of the laboratory instrument.

As used herein, the term "adjusting" relates to a process where a deviation between predefined position information and actual or determined position information of at least one reference structure is corrected or compensated. As the transfer system moves the pipetting device or handling device within the laboratory instrument for positioning, this correction or compensation can be made by a new setting of the drives of the transfer system, wherein the new setting of the drives depends on the deviation between the predefined and determined position information of the at least one reference structure.

In a specific embodiment of the method, the at least one transfer system moves the at least one pipetting device or handling device towards the at least one reference structure from the z direction, x direction, and y direction in step a), the at least one reference structure detection device generates at least three signals upon detection of the at least one reference structure from the z direction, x direction, and y direction and sends the at least three signals to the control device in step b), the control device receives the at least three signals from the at least one reference structure detection device and determines position information of the at least one reference structure based on the received at least three signals in step c).

In a more specific embodiment, immediately after step e) of the disclosed method, the control device determines if the determined deviation between the determined position information of the at least one reference structure and the predefined position information of the at least one reference structure is within a predefined deviation range. If the determined deviation between the determined position information of the at least one reference structure and the predefined position information of the at least one reference structure is within the predefined deviation range step f) is conducted. And if the determined deviation between the determined position information of the at least one reference structure and the predefined position information of the at least one reference structure is not within the predefined deviation range an alert is triggered. The predefined deviation range relates to deviations for which the positioning of the at least one pipetting device or handling device can be adjusted by setting the drives of the transfer system. In the case of deviations which cannot be corrected or compensated by setting the drives of the transfer system, the guide rails of the transfer system must be manually adjusted so that the determined position information is again aligned with the predefined position information of the at least one reference structure. Accordingly, the triggered alert may comprise a recommendation or request for visual inspection of the laboratory instrument and manual adjustment of the transfer system.

In one embodiment of the laboratory system as described herein, said control device is adapted to control the method as described herein.

Further disclosed and proposed is a computer program including computer-executable instructions for performing the method according to the present invention in one or more of the embodiments enclosed herein when the program is executed on the control device. Specifically, the computer program may be stored on a computer-readable data carrier. Thus, specifically, one, more than one or even all of method steps as indicated above may be performed by using the control device, preferably by using the computer program.

Further disclosed and proposed is a computer program product having program code means in order to perform the method disclosed herein in one or more of the embodiments enclosed herein when the program is executed on a control device. Specifically, the program code means may be stored on a computer-readable data carrier.

Referring to the computer-implemented aspects of the invention, one or more of the method steps or even all of the method steps of the method according to one or more of the embodiments disclosed herein may be performed by using a control device. Thus, generally, any of the method steps including provision and/or manipulation of information or data may be performed by using a control device.

One embodiment of the invention is directed to a laboratory instrument (10), comprising: a single base plate (12), wherein the single base plate comprises at least one embedded compartment (14), wherein the at least one embedded compartment (14) comprises at least two side walls (34), which encompass an inner volume (35), a bottom (36), and an open top (38), wherein the at least two side walls (34) are opposite each other or adjacent each other, wherein at least one of said embedded compartment (14) is selected from a group consisting of: an embedded consumable compartment (16), an embedded sample processing compartment (18), an embedded waste compartment (20), an embedded activation device compartment (22), and an embedded rack receiving compartment (24), or a combination thereof; and at least one electrically conductive element (48), wherein the at least one electrically conductive element is mounted on the single base plate (12), wherein the electrically conductive element comprises at least one reference structure (50), wherein the at least one electrically conductive element (48) comprises one or more electrically conductive sheets (49), wherein at least one of the one or more electrically conductive sheets comprises at least one through-hole (52), wherein the at least one through-hole (52) is aligned with the open top (38) of at least one embedded compartment (14), and wherein the at least one through-hole (52) is the at least one reference structure (50). In a related embodiment, the single base plate (12) is made of a thermoplastic or duroplastic polymer. In another embodiment, the single base plate (12) is an injection molding plate. In another embodiment, the at least one embedded compartment (14) comprises rounded corners (30) or rounded edges (32), or a combination thereof. In another embodiment, the single base plate (12) further comprises at least one embedded support element, wherein the at least one of said embedded support element is selected from a group consisting of: a cable channel (40), an air channel (42), a display frame (44), an identification device or sensor holder, an instrument interlock module (46), and a latch-fit or snap-latch, or a combination thereof. In another embodiment, the one or more electrically conductive sheets (49) are mounted on the single base plate (12) with one or more screws (56). In another embodiment, the one or more screws (56) are shoulder screws, and wherein the one or more electrically conductive sheets (49) are additionally mounted with at least one fixed-point (58) on the single base plate (12). In another embodiment, the laboratory instrument further comprises: at least one pipetting device (60) or handling device, wherein the at least one pipetting device (60) or handling device comprises at least one reference structure detection device (62); and at least one transfer system (64), wherein the at least one transfer system is connected to the at least one pipetting device (60) or handling device, wherein the at least one transfer system is constructed to move the at least one pipetting device (60) or handling device in the three-dimensional directions within the laboratory instrument (10). In another embodiment, the laboratory instrument further comprises a control device (76) for controlling the movements of the at least one transfer system.

Another embodiment of the invention is directed to a laboratory system comprising a laboratory instrument, as discussed and described previously; and at least one consumable (66) or at least one sample processing device (68) or at least one rack (70), or a combination thereof. In a related embodiment, the laboratory system further comprises a control device (76) for controlling the movements of the at least one transfer system.

Another embodiment of the invention is directed to a method for adjusting the positioning of at least one pipetting device or handling device of a laboratory instrument, as discussed and described previously, comprising the following steps: (a) the at least one transfer system (64) moves the at least one pipetting device (60) or handling device towards the at least one reference structure (50); (b) the at least one reference structure detection device (62) of the at least one pipetting device (60) or handling device detects the at least one reference structure (50), wherein the at least one reference structure detection device (62) generates at least one signal upon detection of the at least one reference structure (50) and sends the at least one signal to the control device (76); (c) the control device (76) receives the at least one signal from the at least one reference structure detection device (62) and determines position information of the at least one reference structure (50) based on the received at least one signal; (d) the control device (76) compares the determined position information of the at least one reference structure (50) with predefined position information of the at least one reference structure (50); (e) the control device (76) determines and stores a deviation between the determined position information of the at least one reference structure (50) and the predefined position information of the at least one reference structure (50); and (f) the control device adjusts the positioning of the at least one pipetting device or handling device of the laboratory instrument according to the determined and stored deviation between the determined position information of the at least one reference structure and the predefined position information of the at least one reference structure.

Yet another embodiment of the invention is directed to a method for adjusting the positioning of at least one pipetting device or handling device of a laboratory system, as discussed and described previously, wherein the laboratory system comprises a laboratory instrument of claim 8, and at least one consumable (66) or at least one sample processing device (68) or at least one rack (70), or a combination thereof, comprising the following steps: (a) the at least one transfer system (64) moves the at least one pipetting device (60) or handling device towards the at least one reference structure (50); (b) the at least one reference structure detection device (62) of the at least one pipetting device (60) or handling device detects the at least one reference structure (50), wherein the at least one reference structure detection device (62) generates at least one signal upon detection of the at least one reference structure (50) and sends the at least one signal to the control device (76); (c) the control device (76) receives the at least one signal from the at least one reference structure detection device (62) and determines position information of the at least one reference structure (50) based on the received at least one signal; (d) the control device (76) compares the determined position information of the at least one reference structure (50) with predefined position information of the at least one reference structure (50); (e) the control device (76) determines and stores a deviation between the determined position information of the at least one reference structure (50) and the predefined position information of the at least one reference structure (50); and (f) the control device adjusts the positioning of the at least one pipetting device or handling device of the laboratory system according to the determined and stored deviation between the determined position information of the at least one reference structure and the predefined position information of the at least one reference structure.

SHORT DESCRIPTION OF THE FIGURES

FIG. 2A, FIG. 2B, and FIG. 2C show an electrically conductive element, a single base plate, and the electrically conductive element mounted on the single base plate as described herein.

DETAILED DESCRIPTION OF THE FIGURES

Figure 1:
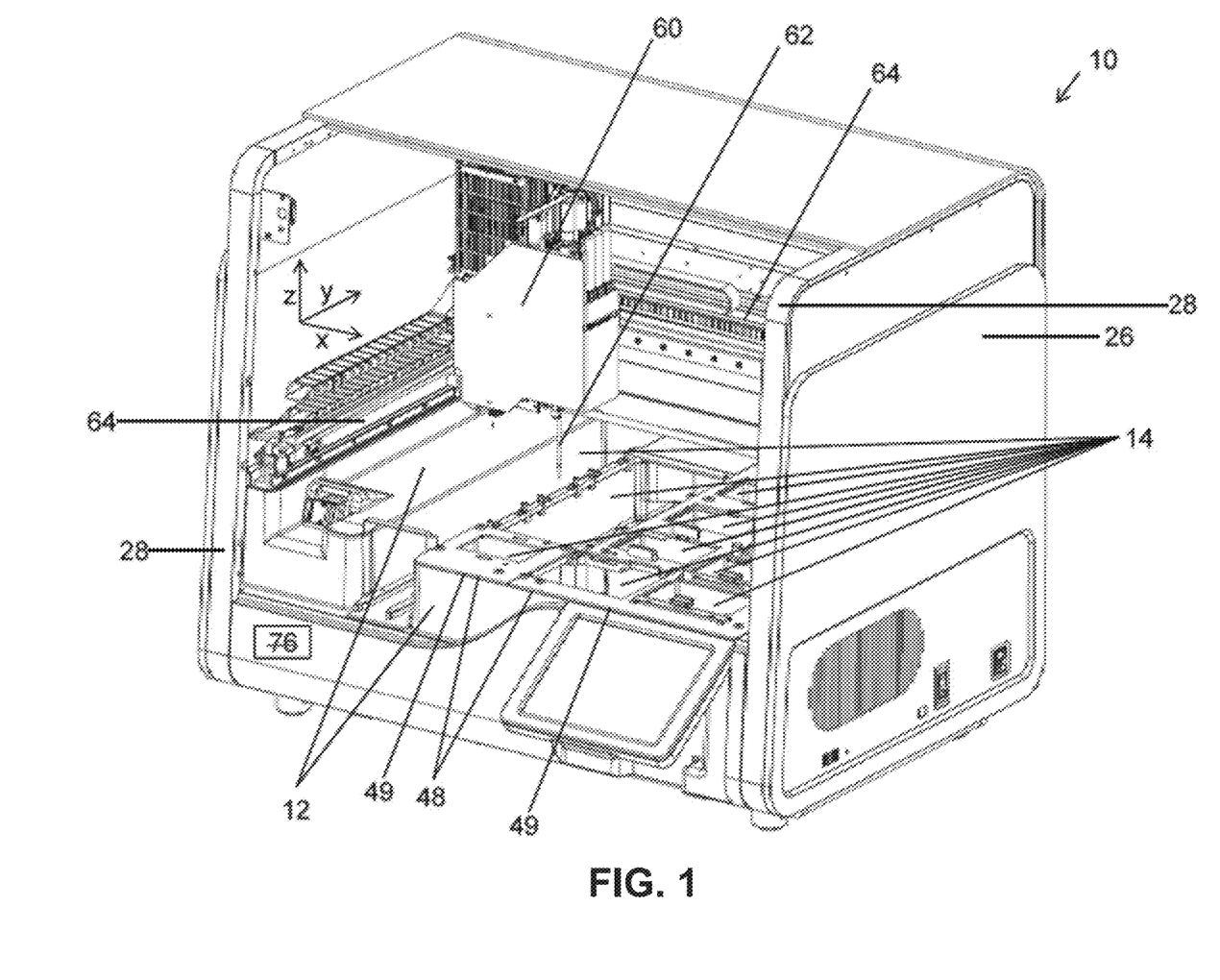
FIG. 1 provides a perspective view of the laboratory instrument as described herein.

FIG. 1 shows a perspective view of the laboratory instrument (10) as described herein. As illustrated, the laboratory instrument (10) comprises a single base plate (12). The single base plate (12) comprises embedded compartments (14) which are further specified in FIG. 2. The laboratory instrument (10) has also a housing (26) comprising a frame (28). It is to be noted that the hood of the laboratory instrument (10) is omitted in FIG. 1 in order to improve the visibility of the interior of the laboratory instrument. The single base plate (12) is mounted on the frame (28) within the laboratory instrument (10). As further shown in FIG. 1, the laboratory instrument comprises a pipetting device (60) equipped with one reference structure detection device (62). In the shown embodiment, the reference structure detection device (62) is a conductive pipette tip. The laboratory instrument (10) has also a transfer system (64) which is connected to the pipetting device (60). In the shown embodiment, the laboratory instrument (10) further comprises a control device (76) for controlling the movements of the transfer system (64). As schematically illustrated, the laboratory instrument has a three-dimensional rectangular coordinate system comprising a x direction, y direction, and z direction. The transfer system (64) is constructed to move the pipetting device (60) in the three-dimensional directions x, y, and z within the laboratory instrument. In the shown embodiment, the laboratory instrument further comprises an electrically conductive element (48) consisting of two electrically conductive sheets (49) which are mounted on the single base plate (12).

Figure 2A:
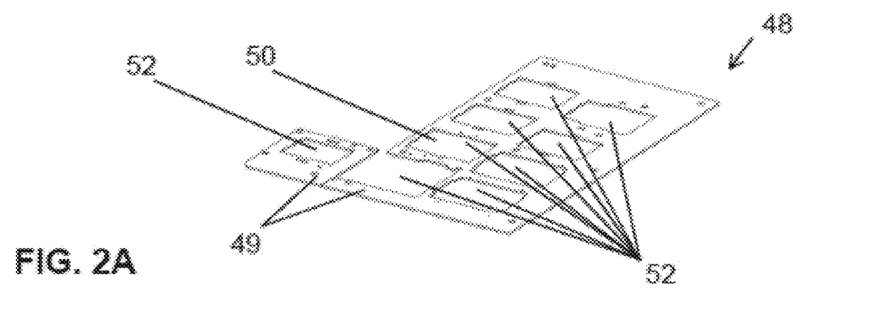
FIG. 2A shows an electrically conductive element in isolated view.
Figure 2B:
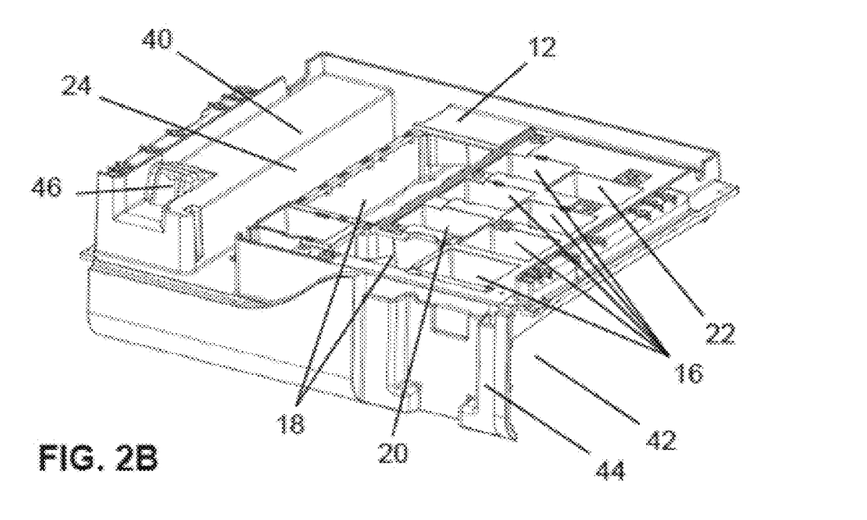
FIG. 2B shows a single base plate of the laboratory instrument in an isolated view.
Figure 2C:
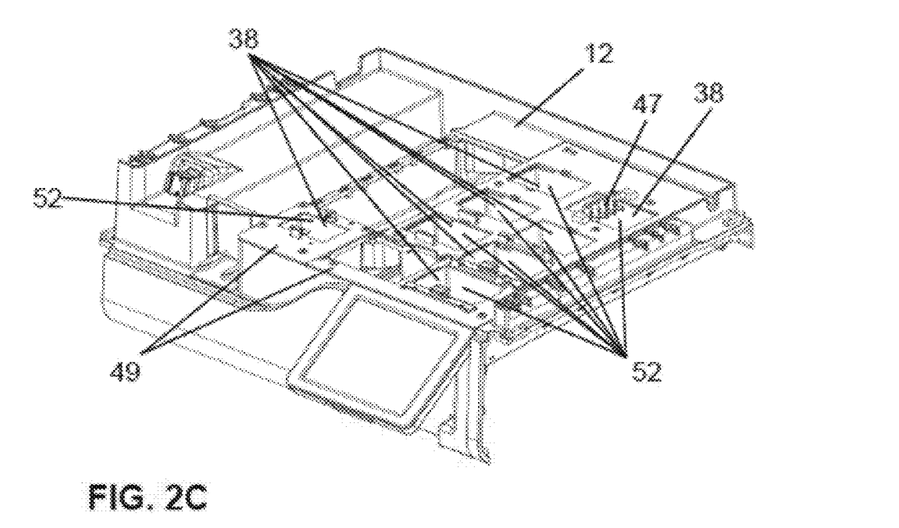
FIG. 2C shows that the single base plate of the laboratory instrument on which the electrically conductive element is mounted.

FIG. 2B shows the single base plate (12) of the laboratory instrument in an isolated view, FIG. 2A shows an electrically conductive element (48) in an isolated view, and FIG. 2C shows the single base plate (12) of the laboratory instrument on which the electrically conductive element (48) is mounted. As shown in FIG. 2B the single base plate (12) which consists of a single piece comprises five embedded consumable compartments (16), two embedded sample processing compartments (18), an embedded waste compartment (20), an embedded activation device compartment (22), and one embedded rack receiving compartment (24). The single base plate (12) further comprises integrated support elements such as a cable channel (40), an air channel (42), a display frame (44), and an instrument interlock module (46). FIG. 2A shows an electrically conductive element (48) consisting of two electrically conductive sheets (49) provided with through-holes (52). In the shown embodiment, at least one of the through-holes (52) is a reference structure (50). However, the other through-holes (52) can also be used as additional reference structures if required. As depicted in FIG. 2C the two electrically conductive sheets (49) can be mounted on the single base plate (12), wherein the through-holes (52) of the electrically conductive sheets (49) are aligned with the open tops (38) of the embedded consumable compartments (16), embedded sample processing compartments (18), embedded waste compartment (20), and embedded activation device compartment (22) of the single base plate (12). As further shown, an activation device (47) is accommodated in the embedded activation device compartment (22).

Figure 3:
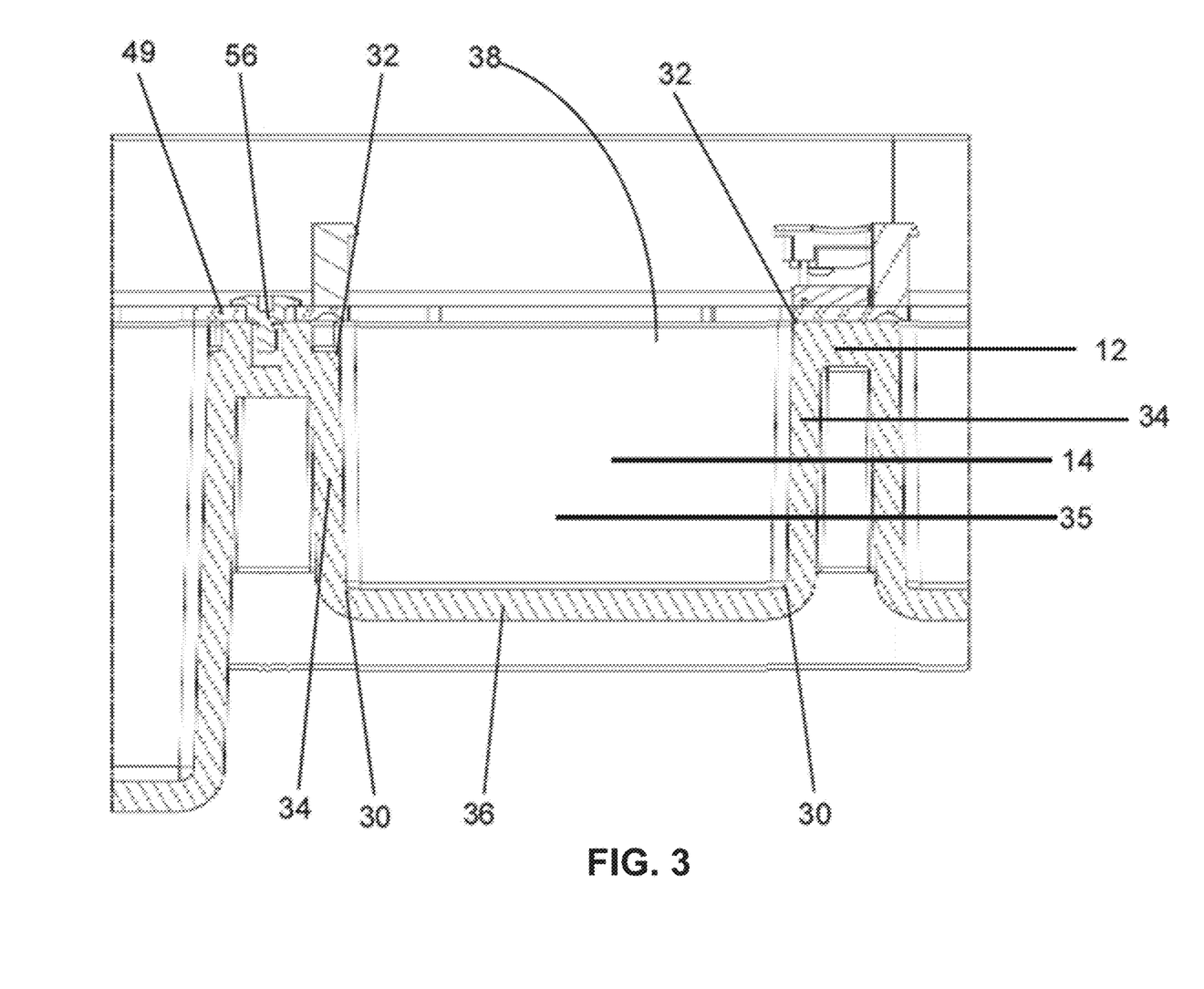
FIG. 3 shows a cross section of the single base plate and the electrically conductive element as described herein.

FIG. 3 shows a cross section of the single base plate (12), embedded compartment (14) and electrically conductive sheet (49). The shown embedded compartment (14) comprises side walls (34), a closed bottom (36), and an open top (38) which encompass an inner volume (35) of the embedded compartment (14). As further shown the embedded compartment (14) comprises rounded corners (30) and rounded edges (32). The electrically conductive sheet (49) is mounted on the single base plate (12) with screws (56). In the shown embodiment, the screws (56) for mounting the electrically conductive sheet is a shoulder screw for a floating mounting of the electrically conductive sheet (49) on the single base plate (12).

Figure 4:
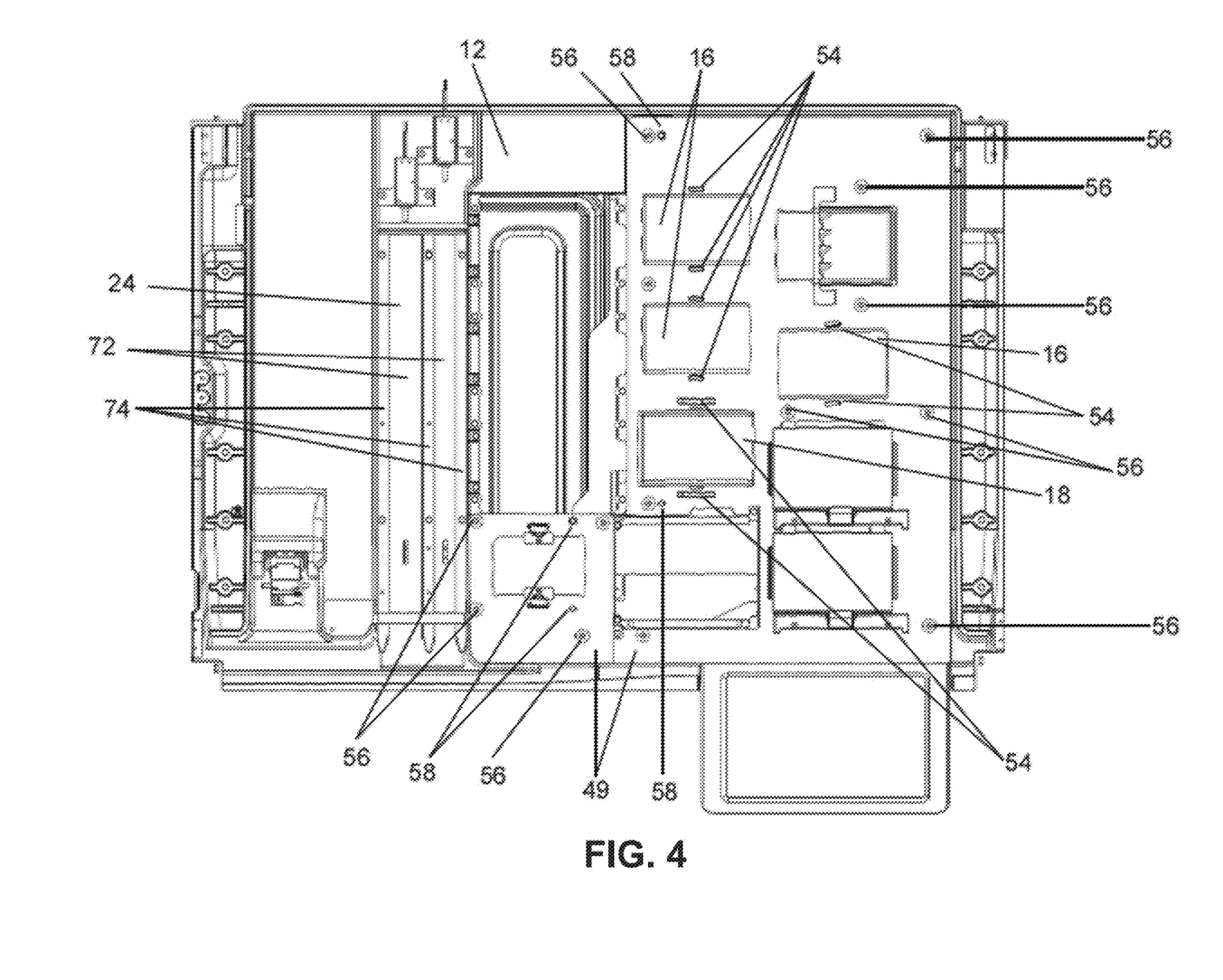
FIG. 4 provides a top view of the single base plate and the electrically conductive element as described herein.

FIG. 4 provides a top view of the single base plate (12) and the electrically conductive sheets (49) which are mounted on the single base plate with shoulder screws (56) and fixed points (58). As shown in FIG. 4, the electrically conductive sheets (49) comprise snap-latches (54) located adjacent to the through-holes which are aligned with the open tops of the embedded consumable compartments (16) and embedded waste compartment (20) for clipping the consumables and waste containers. The shown rack receiving compartment (24) has a sliding surface (72) which comprises three rack guiding elements (74). The three guiding elements divide the sliding surface (72) in two lanes so that sample vessel racks as well as reagent container racks can be slidably moved between the front end and a rear end of the rack receiving compartment (24) in order to load/unload sample vessel racks and reagent container racks into the same embedded rack receiving compartment (24).

Figure 5:
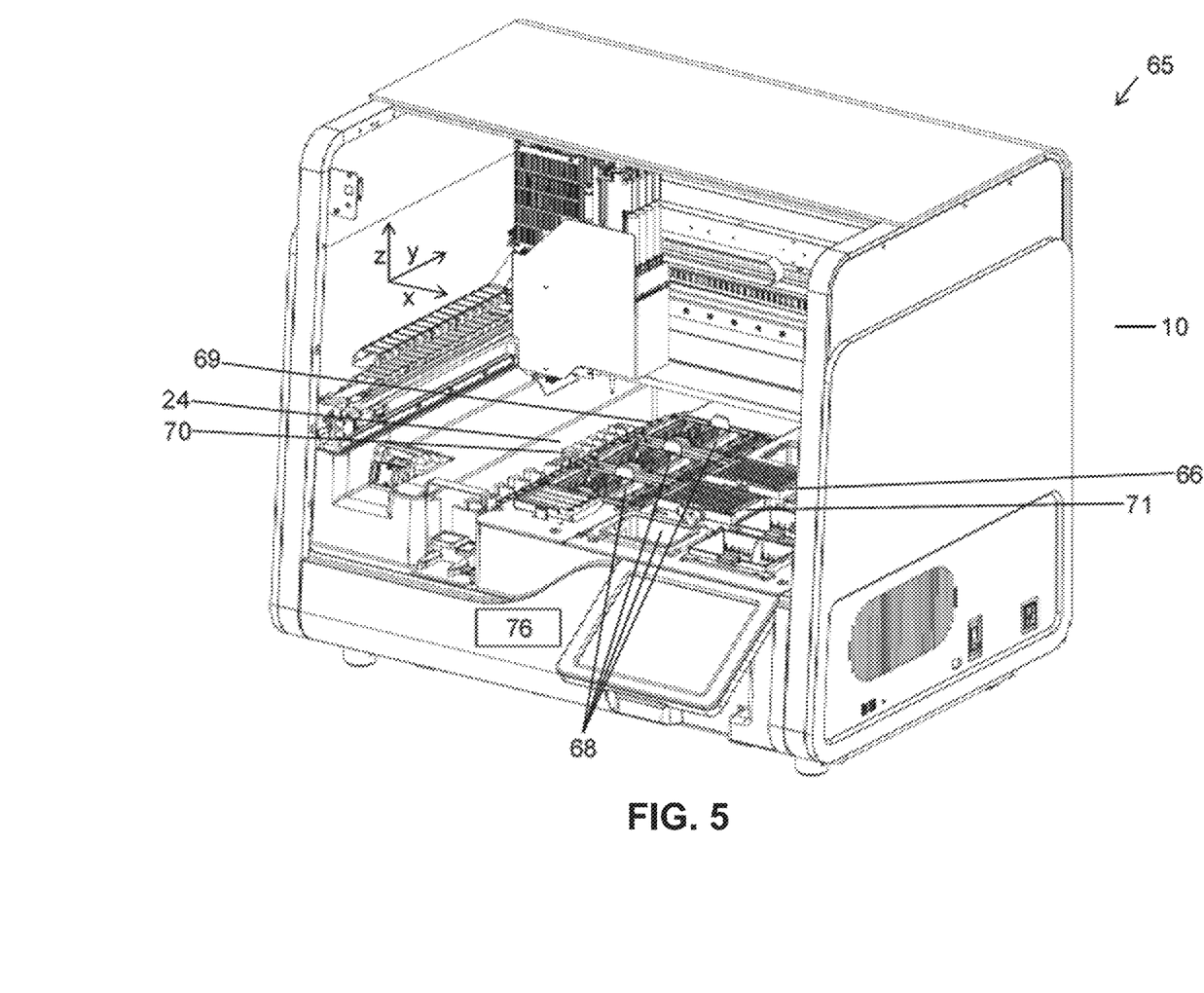
FIG. 5 provides a perspective view of the laboratory system as described herein.

FIG. 5 provides a perspective view of the laboratory system (65) as described herein. The shown laboratory system (65) comprises a laboratory instrument (10) with a consumable (66) in form of a pipette tip rack. The shown laboratory system (65) further comprises sample processing devices (68) in form of three separation and heating devices and one cooling device. The shown laboratory system (65) further comprises one sample vessel rack (69) and one reagent container rack (70) which are in the embedded rack receiving compartment (24). Furthermore, the shown laboratory system (65) comprises also a waste rack (71) in form of a tip waste rack for disposing used pipette tips. To control the movement of the transfer system, the laboratory system comprises a control device (76).

Figures 6A, 6B:
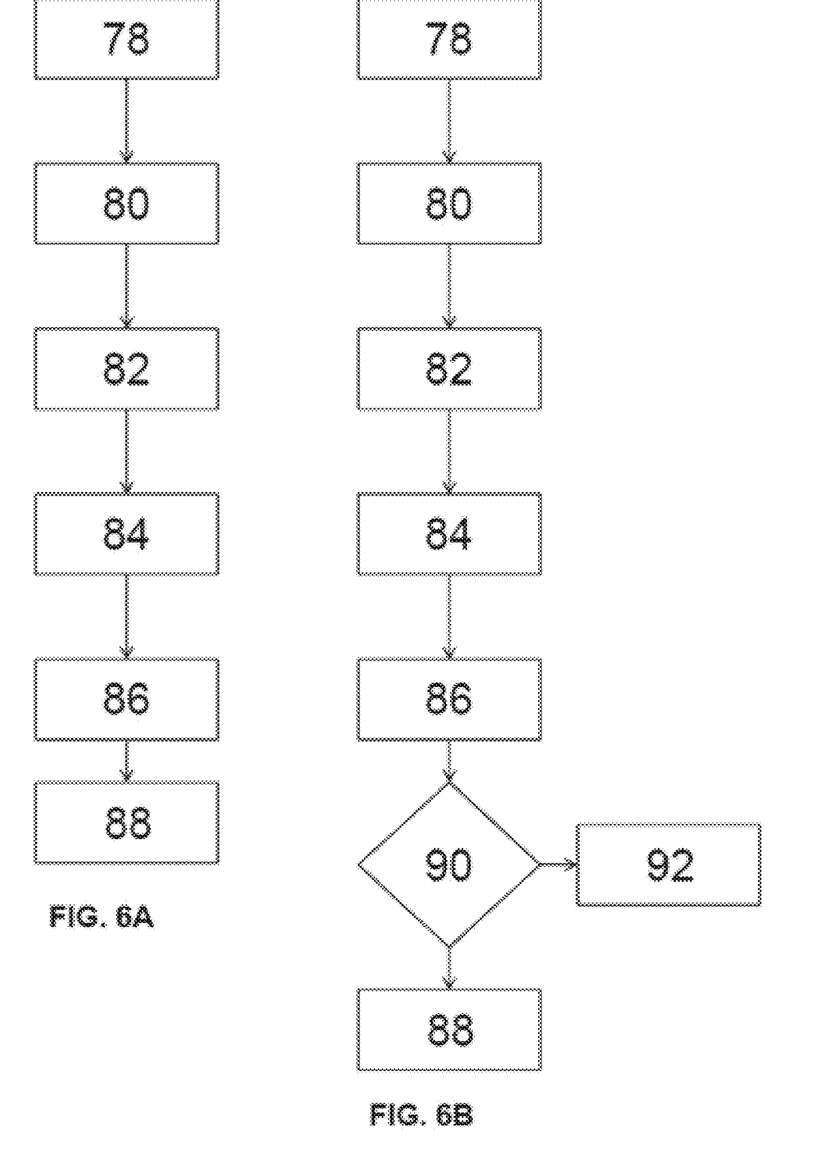
FIG. 6A and FIG. 6B depict flowcharts of the method for adjusting the positioning of at least one pipetting device or handling device of a laboratory system as described herein.

FIG. 6A shows a flowchart of the method for adjusting the positioning of at least one pipetting device or handling device of a laboratory instrument or laboratory system. Before the method is initiated, the operator has to make sure that no consumables (66), waste racks (71), sample vessel racks (69) or reagent container racks (70) prevent the accessibility to the at least one reference structure (50). In step a) (78) of the method the at least one transfer system (64) moves the pipetting device (60) or handling device towards the at least one reference structure (50). In step b) (80) of the method the at least one reference structure detection device (62) of the at least one pipetting device (60) or handling device detects the at least one reference structure (50) and the at least one reference structure detection device (62) generates at least one signal upon detection of the at least one reference structure (50). And the at least one signal is send to the control device (76). In step c) (82) of the method the control device (76) receives the at least one signal from the at least one reference structure detection device (62) and determines position information of the at least one reference structure (50) based on the received at least one signal. Afterwards, the control device (76) compares the determined position information of the at least reference structure (50) with predefined position information of the least one reference structure (50) in step d) (84) of the method. In step e) (86) of the method the control device (76) determines and stores the deviation between the determined position information of the at least one reference structure (50) and the predefined position information of the at least one reference structure (50). According to the determined and stored deviation between the determined position information of the at least one reference structure (50) and the predefined position information of the at least one reference structure (50), the control device adjusts the positioning of the at least one pipetting device (60) or handling device in step f) (88) of the method. As shown in FIG. 6B, one embodiment of the method can comprise two additional steps (90, 92). In the first additional step (90) which is conducted after step e) (86) of the method, the control device (76) determines if the determined deviation between the determined position information of the at least one reference structure (50) and the predefined position information of the at least one reference structure (50) is within a predefined deviation range. If the determined deviation between the determined position information of the at least one reference structure and the predefined position information of the at least one reference structure is within the predefined deviation range step f) (88) of the method is conducted. And if the determined deviation between the determined position information of the at least one reference structure and the predefined position information of the at least one reference structure is not within the predefined deviation range an alert is triggered in the second additional step (92).

LIST OF REFERENCE NUMBERS 10 laboratory instrument
12 single base plate
14 embedded compartment
16 embedded consumable compartment
18 embedded sample processing compartment
20 embedded waste compartment
22 embedded activation device compartment
24 embedded rack receiving compartment
26 housing
28 frame
30 rounded corner
32 rounded edge
34 side wall
35 inner volume
36 closed bottom
38 open top
40 cable channel
42 air channel
44 display frame
46 instrument interlock module
47 activation device
48 electrically conductive element
49 electrically conductive sheet
50 reference structure
52 through-hole
54 snap-latch or latch-fit
56 screw
58 fixed-point
60 pipetting device
62 reference structure detection device
64 transfer system
65 laboratory system
66 consumable
68 sample processing device
69 sample vessel rack
70 reagent container rack
71 waste rack
72 sliding surface
74 guiding elements
76 control device
78 step a of the method
80 step b of the method
82 step c of the method
84 step d of the method
86 step e of the method
88 step f of the method
90 first additional step of the method
92 second additional step of the method

The invention claimed is:

1. A laboratory instrument (10), comprising:
a single base plate (12), wherein the single base plate comprises at least one embedded compartment (14), wherein the at least one embedded compartment (14) comprises at least two side walls (34), which encompass an inner volume (35), a bottom (36), and an open top (38), wherein the at least two side walls (34) are opposite each other or adjacent each other, wherein at least one of said embedded compartment (14) is selected from a group consisting of: an embedded consumable compartment (16), an embedded sample processing compartment (18), an embedded waste compartment (20), an embedded activation device compartment (22), and an embedded rack receiving compartment (24), or a combination thereof; and
at least one electrically conductive element (48), wherein the at least one electrically conductive element is mounted on the single base plate (12), wherein the electrically conductive element comprises at least one reference structure (50), wherein the at least one electrically conductive element (48) comprises one or more electrically conductive sheets (49), wherein at least one of the one or more electrically conductive sheets comprises at least one through-hole (52), wherein the at least one through-hole (52) is aligned with the open top (38) of at least one embedded compartment (14), and wherein the at least one through-hole (52) is the at least one reference structure (50).

2. The laboratory instrument (10) of claim 1, wherein the single base plate (12) is made of a thermoplastic or duroplastic polymer.

3. The laboratory instrument (10) of claim 1, wherein the single base plate (12) is an injection molding plate.

4. The laboratory instrument (10) of claim 1, wherein the at least one embedded compartment (14) comprises rounded corners (30) or rounded edges (32), or a combination thereof.

5. The laboratory instrument (10) of claim 1, wherein the single base plate (12) further comprises at least one embedded support element, wherein the at least one of said embedded support element is selected from a group consisting of: a cable channel (40), an air channel (42), a display frame (44), an identification device or sensor holder, an instrument interlock module (46), and a latch-fit or snap-latch, or a combination thereof.

6. The laboratory instrument (10) of claim 1, wherein the one or more electrically conductive sheets (49) are mounted on the single base plate (12) with one or more screws (56).

7. The laboratory instrument (10) of claim 6, wherein the one or more screws (56) are shoulder screws, and wherein the one or more electrically conductive sheets (49) are additionally mounted with at least one fixed-point (58) on the single base plate (12).

8. The laboratory instrument (10) of claim 1, further comprising:
at least one pipetting device (60) or handling device, wherein the at least one pipetting device (60) or handling device comprises at least one reference structure detection device (62); and
at least one transfer system (64), wherein the at least one transfer system is connected to the at least one pipetting device (60) or handling device, wherein the at least one transfer system is constructed to move the at least one pipetting device (60) or handling device in the three-dimensional directions within the laboratory instrument (10).

9. The laboratory instrument of claim 8, further comprising a control device (76) for controlling the movements of the at least one transfer system.

10. A laboratory system comprising
the laboratory instrument in any one of claims 1-8; and
at least one consumable (66) or at least one sample processing device (68) or at least one rack (70), or a combination thereof.

11. The laboratory system of claim 10, further comprising a control device (76) for controlling the movements of the at least one transfer system.

12. A method for adjusting the positioning of at least one pipetting device or handling device of a laboratory instrument of claim 9, comprising the following steps:
(a) enabling the at least one transfer system (64) to move the at least one pipetting device (60) or handling device towards the at least one reference structure (50);
(b) enabling the at least one reference structure detection device (62) of the at least one pipetting device (60) or handling device to detect the at least one reference structure (50), wherein the at least one reference structure detection device (62) generates at least one signal upon detection of the at least one reference structure (50) and sends the at least one signal to the control device (76);
(c) enabling the control device (76) to receive the at least one signal from the at least one reference structure detection device (62) and to determine position information of the at least one reference structure (50) based on the received at least one signal;
(d) enabling the control device (76) to compare the determined position information of the at least one reference structure (50) with predefined position information of the at least one reference structure (50);
(e) enabling the control device (76) to determine and store a deviation between the determined position information of the at least one reference structure (50) and the predefined position information of the at least one reference structure (50); and
(f) enabling the control device to adjust the positioning of the at least one pipetting device or handling device of the laboratory instrument according to the determined and stored deviation between the determined position information of the at least one reference structure and the predefined position information of the at least one reference structure.

13. A method for adjusting the positioning of at least one pipetting device or handling device of a laboratory system of claim 11, wherein the laboratory system comprises a laboratory instrument of claim 8, and at least one consumable (66) or at least one sample processing device (68) or at least one rack (70), or a combination thereof, comprising the following steps:
(a) enabling the at least one transfer system (64) to move the at least one pipetting device (60) or handling device towards the at least one reference structure (50);
(b) enabling the at least one reference structure detection device (62) of the at least one pipetting device (60) or handling device to detect the at least one reference structure (50), wherein the at least one reference structure detection device (62) generates at least one signal upon detection of the at least one reference structure (50) and sends the at least one signal to the control device (76);
(c) enabling the control device (76) to receive the at least one signal from the at least one reference structure detection device (62) and to determine position information of the at least one reference structure (50) based on the received at least one signal;
(d) enabling the control device (76) to compare the determined position information of the at least one reference structure (50) with predefined position information of the at least one reference structure (50);
(e) enabling the control device (76) to determine and store a deviation between the determined position information of the at least one reference structure (50) and the predefined position information of the at least one reference structure (50); and
(f) enabling the control device to adjust the positioning of the at least one pipetting device or handling device of the laboratory system according to the determined and stored deviation between the determined position information of the at least one reference structure and the predefined position information of the at least one reference structure.

* * * * *